July 9, 1968     I. MAY     3,392,059
PROCESS OF PRODUCING NICKLE CATALYST USING SODIUM BORON HYDRIDE
Filed Oct. 30, 1964     4 Sheets-Sheet 2

INVENTOR.
INGEBORG MAY

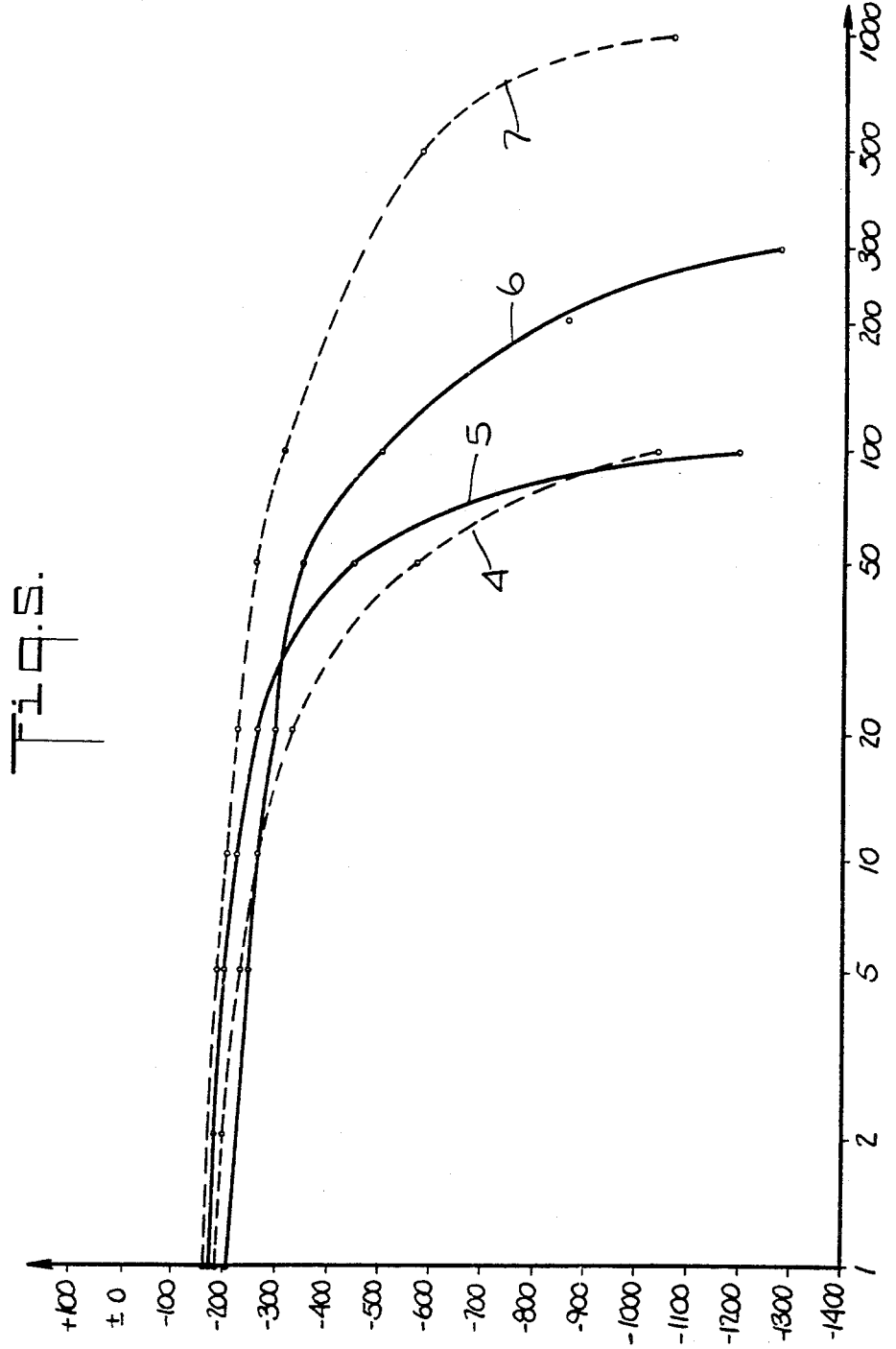

3,392,059
PROCESS OF PRODUCING NICKEL CATALYST USING SODIUM BORON HYDRIDE
Ingeborg May, Gravenbruch, near Frankfurt am Main, Germany, assignor to Varta Aktiengesellschaft, Hagen, Westphalia, Germany, a corporation of Germany
Filed Oct. 30, 1964, Ser. No. 407,703
Claims priority, application Germany, Oct. 30, 1963, V 24,779
2 Claims. (Cl. 136—86)

The present invention relates to highly active catalysts and more particularly to highly active catalysts useful in the activation of hydrogen or oxygen, to a process making such catalysts, and to their use as electrochemically effective component of fuel cell electrodes.

It is already known to precipitate catalytically active agents from aqueous heavy metal salt solutions by means of reducing compounds, for instance, by means of alkali metal boron hydrides. Depending upon the nature of the respective metal which is present in the salt solution, either borides are formed or the precipitates consist of the pure metal in finely divided form.

It is one object of the present invention to provide especially effective catalysts for the activation of hydrogen or oxygen which catalysts are superior in their activity to known catalysts of this type.

Another object of the present invention is to provide a simple and effective method of producing such highly effective catalysts.

A further object of the present invention is to use such catalysts as electrochemically effective components in electrodes of fuel cells.

Still another object of the present invention is to provide highly effective catalytic electrodes for fuel cells.

Other objects of the present invention and advantageous features thereof will become apparent as the description proceeds.

In principle, the process according to the present invention of producing highly effective catalysts which are useful in the activation of hydrogen or oxygen consists in precipitating the catalytically active agent from a heavy metal salt solution by means of an alkali metal boron hydride, whereby the precipitation is carried out in organic solvents.

Heavy metals, the salts of which are used in the preparation of catalytically active agents according to the present invention, are metals of the VIIIth group as well as of Groups Ib and IIb of the periodic system of elements. Especially suitable for the purpose of the present invention are salts of the metals iron, cobalt, nickel, platinum, palladium, osmium, copper, silver, gold, and mercury. Nickel is the preferred metal. Metals which form oxygen-containing, soluble compounds in alkaline as well as acid electrolytes are not suitable for the purpose of the present invention.

When precipitating solutions of salts of said metals in organic solvents with alkali metal boron hydrides, the borides of iron, cobalt, and nickel are formed. Copper yields metallic copper as well as copper boride. The salt solutions of the noble metals platinum, palladium, osmium, silver, and gold yield, on precipitation with alkali metal boron hydride solutions, the metals in finely divided form. Mercury is preferably only used as additive to the main catalyst due to its liquid state. Copper alone does not form satisfactory catalysts but considerably improves the activity of the nickel, iron, and cobalt borides, when precipitated in mixture therewith.

Suitable organic solvents are lower aliphatic alcohols such as methanol or ethanol, furthermore dimethyl formamide, diethyl formamide, pyridine, methyl substituted pyridines such as the picolines, lower aliphatic ketones, ethers, dioxane and the like.

It is, of course, understood that mixtures of such solvents may also be used if required. For instance, the alkali metal boron hydride may be dissolved in one of the solvents such as methanol, while the heavy metal salt is dissolved in another solvent, such as dimethyl formamide, and precipitation is then effected by combining these two solutions. Preferably freshly prepared sodium boron hydride solutions are used because sodium boron hydride is not fully stable in methanol and similar solvent. Preferably the solvents are selected in such a manner that at least 1% to 5% solutions of the metal salt as well as of the precipitating agent are obtained and used for precipitation. Other solvents which may also be used for the purpose of the present invention are lower aliphatic amines such as n-propylamine, isopropylamine, n-butylamine, ethylene diamine; morpholine; glycol ethers such as ethylene glycol dimethyl ether, diethylene glycol dimethyl ether, and others as for instance enumerated in the periodical "Angewandte Chemie," 1960, p. 996, Verlag Chemie GmbH., Weinheim/Bergstrasse, Germany.

Especially active catalytic agents are obtained when carrying out the precipitation at a temperature between about $-40°$ C. and about $+10°$ C., preferably at a temperature between $-10°$ C. and $+5°$ C. When operating at higher temperatures, for instance, at room temperature, less active, more coarsely crystalline catalysts are precipitated. In general, room temperature should not be exceeded.

The metal salt solutions used in the preparation of catalysts according to the present invention may contain any desired acidic anions. In many instances, best results are achieved when using as anions the acetates or perchlorates. The perchlorates have proved to be especially suitable for the preparation of silver catalysts. The acetates are preferred in the precipitation of nickel. Of course, the anions of the metal salts are selected in such a manner that the respective metal salts are relatively well soluble in the organic solvent used.

Especially suitable metal salts are, for instance, ferrous perchlorate, ferrous chloride, ferrous acetate, cobalt acetate, nitrate, chloride, bromide, sulfate, and the corresponding nickel salts, such as nickel perchlorate, chloride, acetate, nitrate, bromide, sulfate, and others. Platinum tetrabromide ($PtBr_4$), ammonium bromo platinate $$(NH_4)_2PtBr_6$$

platinum dichloride ($PtCl_2$), and platinum tetrachloride ($PtCl_4$) which are readily soluble in acetone; potassium palladium chloride $K_2PdCl_4$ and ammonium palladium chloride $(NH_4)_2PdCl_6$ which are readily soluble in lower alcohols. The following gold salts are very readily soluble in acetone and slightly less soluble in ethanol: Sodium auri chloride $NaAuCl_4 \cdot 2H_2O$ and potassium auri chloride $AuKCl_4 \cdot 2H_2O$. Auric chloride $AuCl_3$ and chloro auric acid $HAuCl_4 \cdot 4H_2O$ are well soluble in ethanol. Mercuric bromide and mercuric iodide are soluble in a mixture of acetone, methanol, and ether; mercuric chloride is soluble in methanol, ethanol, and a mixture of acetone and ether; mercuro chloride is soluble in benzene and pyridine. Selection of the solvent is of importance because it has a certain effect upon the activity of the catalyst. Thus is has proved to be especially advantageous to use methanol as a solvent for the preparation of metal borides, such as for dissolving iron, cobalt, nickel, and copper salts, while dimethyl formamide has proved to be of value in the preparation of metallic catalysts and especially of silver catalysts.

According to an especially advantageous embodiment of the present invention, a considerable increase in the catalytic activity is achieved when adding small amounts of salts of the metals iron, copper, gold, or platinum during the preparation of nickel catalysts. These metal salts are preferably added in amounts of about 0.5% to about 10%. They cause a many times increased catalytic activity as will become evident from the comparative tests described hereinafter.

The process of producing highly active catalysts according to the present invention is, for instance, carried out by first producing a solution of the respective metal salt in a suitable organic solvent, dissolving preferably an excess of an alkali metal boron hydride in the same solvent or in a solvent miscible with the other solvent, cooling both solutions to a temperature of about −40° C., and gradually combining the solutions while stirring vigorously. Preferably the alkali metal boron hydride solution is added to the metal salt solution, whereby care is taken that the added alkali metal boron hydride solution is immediately dispersed and mixed with the metal salt solution. Thereby, the temperature increases and a precipitate of the highly active catalyst is formed. Said precipitate is purified, preferably by repeated decanting and suspending, for instance, in methanol. The catalyst is kept suspended in and covered by the solvent. In place of the solvent, alkali metal hydroxide solution may be used for covering and protecting the catalyst. If metal halogenides have been used as salts in the preparation of the catalysts, it is necessary to remove the chlorine ion by washing the precipitate.

The catalysts obtained according to the present invention are suitable for the activation of hydrogen. Some of them, for instance, silver, osmium, or gold catalysts are also well suitable for the activation of oxygen. The new catalysts have proved to be especially useful as catalysts for electrodes in fuel cells for activating hydrogen or hydrogen containing gas mixtures, or for activating pure oxygen or atmospheric oxygen. The catalysts may also be used as catalysts for electrodes in other electrochemical devices such as, for instance, electrolytic apparatus.

When proceeding according to the present invention, catalysts are obtained which are in an extremely finely divided state. Their particle size is below one $\mu$ and usually about $0.1\mu$. In this respect, the new catalysts are different from other catalysts of the same or similar chemical composition, the particles of which usually have a diameter larger than one $\mu$.

By way of example and without in any way limiting the invention thereto, the accompanying drawings serve to illustrate fuel cells provided with electrodes containing catalysts according to the present invention.

In the drawings FIG. 1 illustrates a cross-sectional view of a fuel cell with two electrodes.

FIG. 5 illustrates the potentials of electrodes prepared according to Example 7 given hereinafter, in oxygen half cell arrangement.

Figure 1:
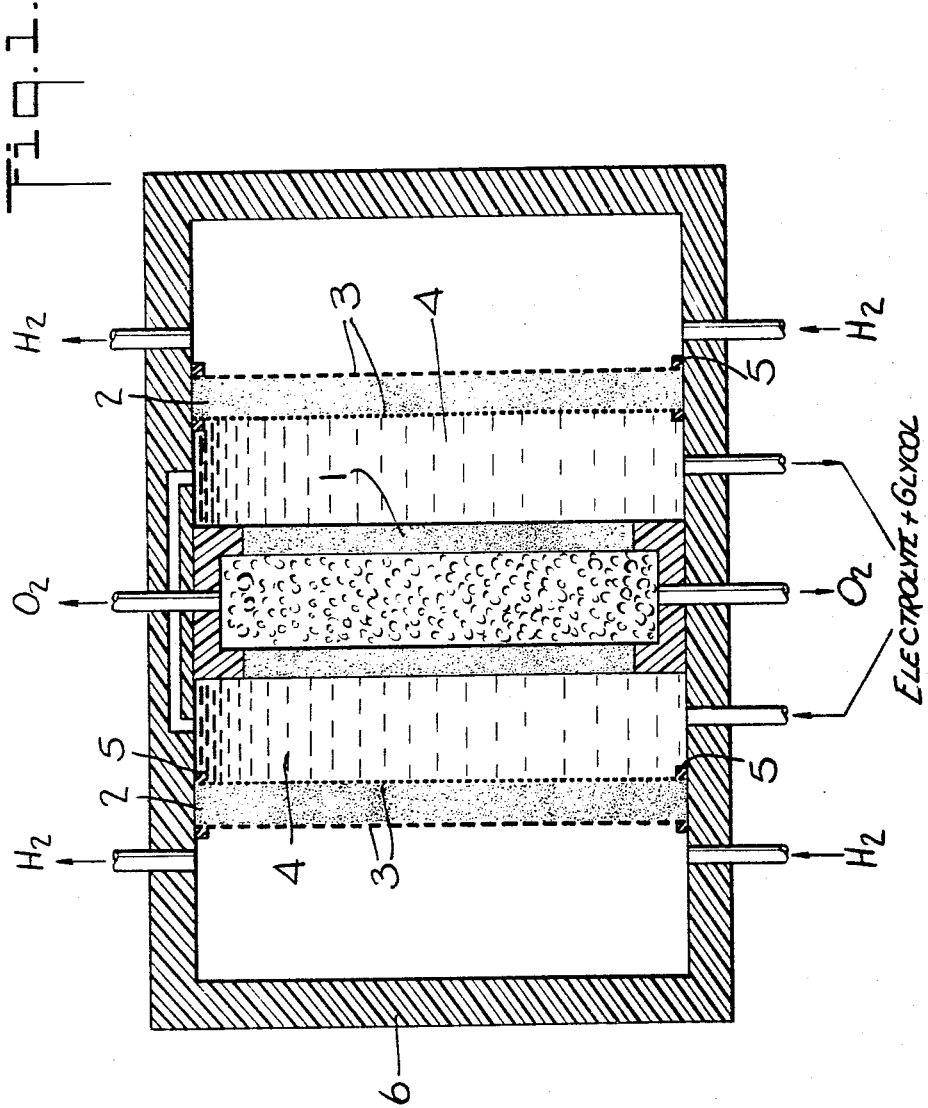

In FIG. 1 cathode 1 is a sintered nickel body impregnated with finely divided gold as produced according to Example 7. Anode 2 consists of nickel boride catalyst with platinum addition in powder form as produced according to Example 4. Said nickel boride catalyst is kept between nickel microsieves 3. Electrolyte 4 in the space between the two anodes 2 is a 6 N potassium hydroxide solution which contains a liquid fuel such as ethylene glycol, for instance, in a 6% solution therein. The electrodes are mounted in frame 5 and placed in container 6 into which oxygen is introduced.

Figure 2:
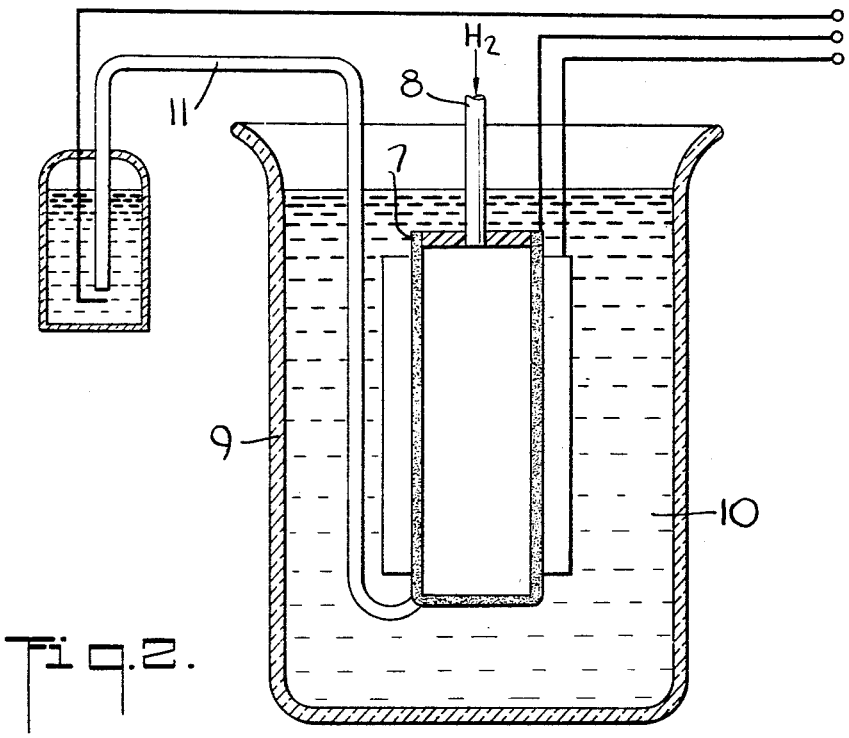
FIG. 2 illustrates a cross-sectional view through an electrical arrangement known as "half cell" connection.

FIG. 2 illustrates a half-cell arrangement wherein electrode 7 is a hydrogen electrode prepared according to Example 6(b). Hydrogen gas is introduced through conduit 8 into container 9 in which 6 N potassium hydroxide solution is placed as electrolyte 10. As standard hydrogen reference electrode, there is used a saturated calomel electrode 11.

Figure 3:
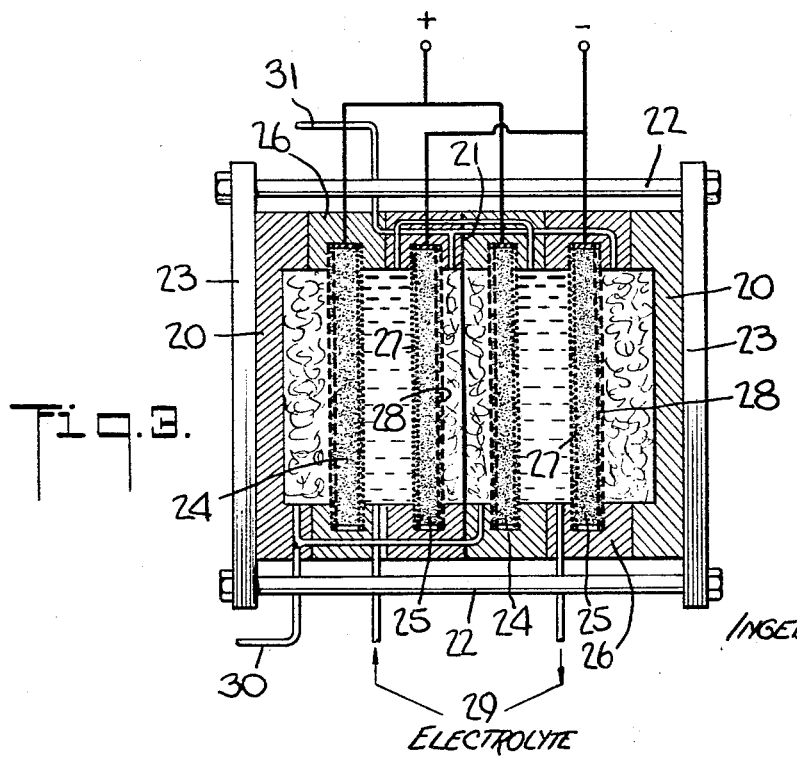
FIG. 3 illustrates a cross-sectional view through a conventional fuel battery provided with electrodes containing catalysts according to the present invention.

FIG. 3 shows a gas diffusion cell consisting of four electrodes—two negative ones and two positive ones—which are sheathed by thermoplastic synthetic resin annular frame members, with a separation wall 21 between adjacent pairs of negative and positive electrodes. Two disk-shaped bodies 20 made of thermoplastic synthetic resin seal the outer electrodes of the fuel cell. In FIG. 3 the thermoplastic synthetic resin frame members appear thicker than they actually are to show the supply lines for fuel and electrolyte more clearly. If desired, the frame members may also be provided with longitudinal bores accommodating the rods 22 which hold the electrode structure together, thus eliminating separate end walls 23. Instead of holding the fuel cell electrodes together by means of tie bolts, this may be done by welding or glueing the thermoplastic frame members together.

In order to provide a better and simpler mechanical contact between the thermoplastic frame members before and while welding or glueing, respectively, it is advantageous to equip their rims with suitable mortises and tenons.

Oxygen electrodes 24 are prepared according to Example 7, given hereinafter. They consist of silver deposited on a sintered nickel body. Hydrogen electrodes 25 consist of nickel boride powder with platinum addition as produced according to Example 4 described hereinafter and placed between nickel microsieves 27 and 28. Electrodes 24 and 25 are mounted in frames 26. The electrolyte 29 of 6 N potassium hydroxide solution is circulated between electrode pairs 24 and 25.

Oxygen is supplied to the oxygen electrodes 24 through conduits 30 while hydrogen is supplied through hydrogen conduits 31 to the fuel electrodes 25.

The following examples serve to illustrate the present invention without, however, limiting the same thereto.

Example 1.—Preparation of a nickel boride catalyst (a) By precipitation from an aqueous solution 145 cc. of a nickel acetate solution containing about 1.84 g. of nickel and 32.5 cc. of a 10% aqueous sodium boranate solution are mixed with each other at 0° C., while stirring. The resulting precipitate of nickel boride of the formula $Ni_2B$ is filtered off by suction and is repeatedly washed with distilled water and finally with ethanol. The resulting 2 g. of nickel boride are then suspended in 100 cc. of ethanol and tested for its hydrogenation activity. It is capable of absorbing 45 cc. of hydrogen per hour.

The hydrogenation test used for determining the activity of this catalyst as well as of the catalysts described in the following examples is carried out with 2 g. of the ethanol-moist catalyst in a mixture of 100 cc. of ethanol and 10 cc. of nitro benzene in a conventional shaking hydrogenation apparatus. The hydrogenation container has a volume of 750 cc. Hydrogenation takes place at room temperature under a slight hydrogen pressure at a shaking frequency of 120 reciprocating movements per minute.

(b) Precipitation of nickel boride from methanol

A saturated methanolic solution of nickel acetate containing about 1.84 g. of nickel is quantitatively precipitated by the addition of 32.5 cc. of a 10% solution of sodium boron hydride in methanol at 0° C., while stirring.

The resulting precipitate of nickel boride is thoroughly washed with methanol, then suspended in 100 cc. of ethanol, and used under identical conditions as described in Example 1(a) for the hydrogenation test. Thereby, 300 cc. of hydrogen are absorbed per hour.

Example 2.—Preparation of nickel boride catalyst with iron addition 0.78 g. of ferrous bromide are dissolved in 40 cc. of methanol. 5.6 g. of nickel acetate, dissolved in 160 cc. of methanol, are added thereto. Addition of 50 cc. of a 5% methanolic sodium boron hydride solution precipitates from said solution at 0° C. the catalyst in the form of a black precipitate. The precipitate is washed with methanol and suspended in 100 cc. of ethanol. The hydrogenation test carried out under the conditions given in Example 1 shows that such a catalyst absorbs 1500 cc. of hydrogen per hour.

Example 3.—Nickel boride catalyst with copper addition 0.758 g. of crystalline copper nitrate and 5.6 g. of nickelous acetate are dissolved in 200 cc. of methanol.

50 cc. of a 5% solution of sodium boron hydride in methanol are added thereto at 0° C., while stirring. The resulting precipitate is thoroughly washed with methanol and is then suspended in 100 cc. of methanol. The catalyst absorbs 500 cc. of hydrogen per hour when tested according to the hydrogenation test described in Example 1(a).

Example 4.—Nickel boride catalyst with platinum addition

Three equal volume portions of solutions of chloro platinic acid in methanol are prepared, the first one containing 0.08 g., the second one containing 0.4 g., and the third one containing 0.8 g. of chloro platinic acid. Each of these solutions is then mixed with a solution of 5.6 g. of nickelous acetate in methanol and the mixtures are cooled to −40° C. Three fresh prepared portions of methanolic solutions, each containing 3 g. of sodium boron hydride, also cooled to −40° C., are then added to each of said nickelous acetate solutions, while stirring. During precipitation, the temperature increases to about 0° C. The precipitates are allowed to settle, filtered by suction, and thoroughly washed with methanol while excluding air. The resulting catalysts are used in moist condition in 100 cc. of methanol for the above described hydrogenation test. The catalyst obtained with 0.08 g. of chloro platinic acid shows a hydrogen absorption of 1800 cc. per hour, the catalyst with 0.4 g. of chloro platinic acid a hydrogen absorption of 3000 cc. per hour, and the catalyst with 0.8 g. of chloro platinic acid a hydrogen absorption of 2500 cc. per hour. In contrast thereto, a hydrogenation test with the same amount of platinum but without the nickel boride, yields a product with a hydrogen absorption of only 650 cc. per hour.

When precipitating the platinum under identical conditions from an aqueous medium at 0° C., the hydrogenation test was negative, i.e. no measurable amount of hydrogen was absorbed within one hour.

Example 5.—Nickel boride catalyst with the addition of gold 2.9 cc. of a tetrachloro aurate solution $K(AuCl_4)$ with a gold content of 7.24% are added to a solution of 5.6 g. nickelous acetate in methanol. A fresh mixed solution of 3 g. sodium boron hydride in methanol is admixed thereto at 0° C. and the resulting precipitate is centrifuged, washed with methanol, and is used in methanol-moist condition and suspended in 100 cc. of methanol for the above mentioned hydrogenation test. The resulting nickel boride catalyst containing 10% of gold absorbs hydrogen in an amount of 2700 cc. per hour.

Example 6

(a) A porous nickel electrode of a porosity of about 60% is produced by pressing carbonyl nickel powder commercially available as Mond nickel A with the addition of 10% of ammonium carbonate at a pressure of 1.6 metric tons per sq. cm. The resulting compressed body is sintered at 650° C. in a vacuum for 15 minutes. It is then impregnated with a dilute aqueous solution of 1.5% of silver nitrate, dried, and treated with a 10% aqueous solution of sodium boron hydride. Thereby a precipitate of finely divided silver is produced in the pores of the sintered nickel body. After washing with water, the process of impregnating, drying, and precipitating the catalyst in the nickel electrode is repeated until the catalyst in the electrode amounts to about 2.0%.

Figure 4:
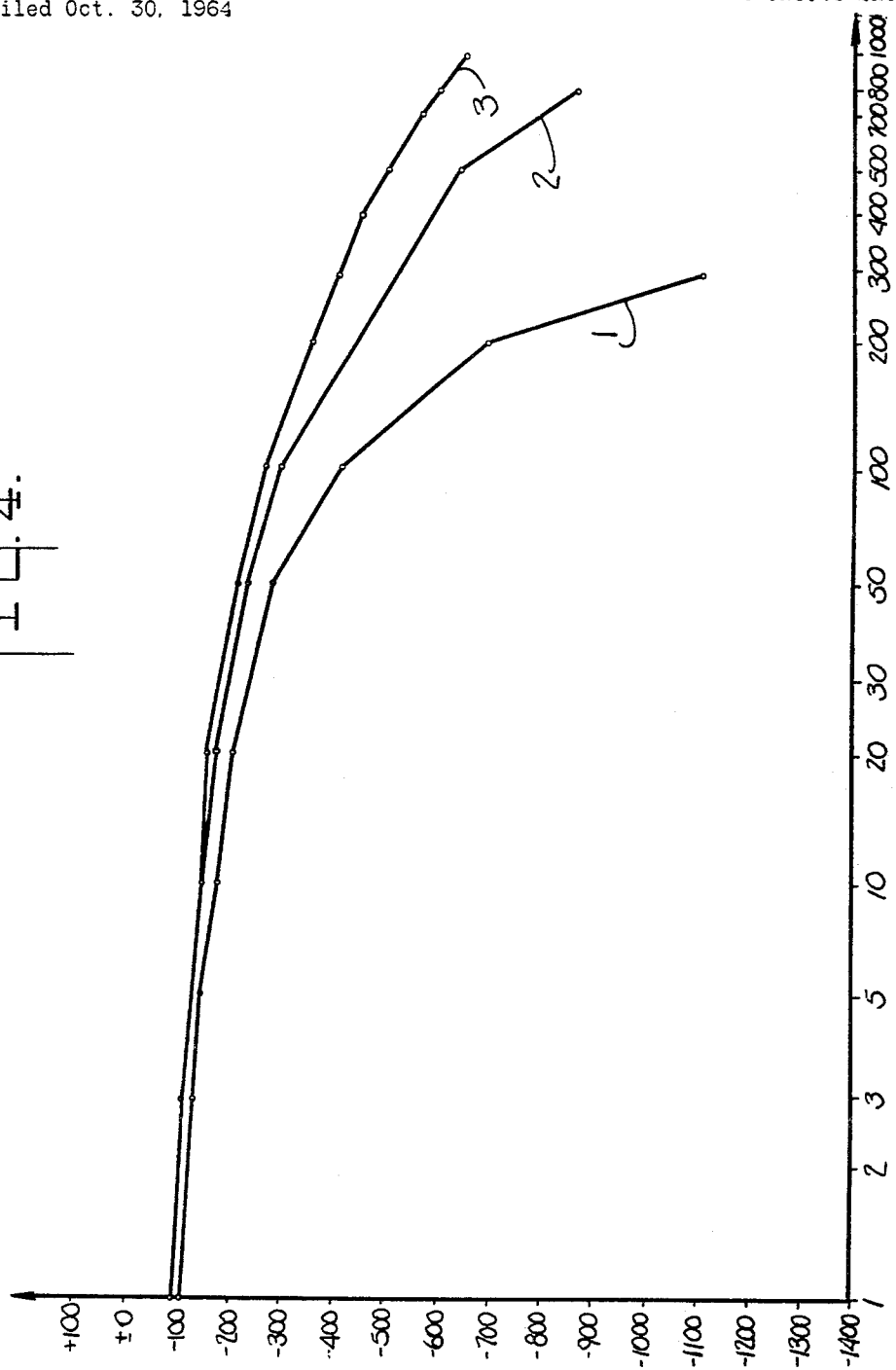
FIG. 4 illustrates the potentials of electrodes prepared according to Example 6 given hereinafter, in half cell arrangement.

When using such an electrode in a fuel half-cell arrangement, it exhibits a potential shown by curve 1 of FIG. 4. The temperature during this test is 40° C. 6 N potassium hydroxide solution is used as electrolyte. The oxygen pressure is 0.6 atm. gauge.

(b) A porous sintered nickel body as described in Example 6(a) is impregnated with a 1.5% silver nitrate solution in methanol. The silver is precipitated by the addition of a 5% sodium boron hydride solution in methanol. The potential of such an electrode when tested in a fuel half-cell arrangement of the same type as used in Example 6(a), is illustrated by curve 2 of FIG. 4. It is evident that such a silver catalyst carried by a sintered nickel electrode can be exposed to considerably higher loads.

(c) The procedure is the same as described in Examples 6(a) and 6(b), whereby, however, the silver is precipitated by sodium boron hydride in the sintered nickel body with the use of dimethyl formamide as solvent. The silver nitrate content of its dimethyl formamide solution is about 1%, the boranate content is 4%.

Curve 3 of FIG. 1 shows that this electrode can be exposed to an even higher load than the catalyst electrode of Example 6(b) produced with the use of methanol as solvent.

Example 7

In the same manner as described in Examples 6(a) and 6(b) there are impregnated porous sintered nickel bodies with finely divided gold by impregnation with a tetrachloro aurate solution and precipitation with sodium boron hydride solution.

FIG. 5 shows the potential of such electrodes in oxygen half-cell arrangement. Curves 4 and 5 illustrate the potentials of electrodes which were catalytically activated by precipitation of gold in aqueous medium, while curves 6 and 7 illustrate the potentials of electrodes obtained by precipitation in ethanol. Curves 4 and 6 were tested at 20° C. and curves 5 and 7 at 60° C. The oxygen pressure was between 0.5 atm. gauge and 0.6 atm. gauge. 5.2 N potassium hydroxide solution was used as electrolyte. It is evident that the catalytically activated electrodes prepared in ethanol exhibit a considerably improved potential, especially on higher loads.

Example 8

(a) A 5% aqueous sodium boranate solution is added to 50 cc. of an aqueous solution of chloro platinic acid to precipitate 0.015 g. of platinum at a temperature at −23° C. and −19° C. After settling, the precipitate is filtered off by suction, washed with methanol, and subjected to the above described hydrogenation test by shaking in 100 cc. of methanol. No hydrogen is absorbed.

(b) When a methanolic solution with the same sodium boranate content as in Example 8(a) is added to a methanolic solution with the same content as mentioned before of chloroplatinic acid at a temperature between −23° C. and −17° C., the resulting precipitate of 0.015 g. of platinum is allowed to settle and is then filtered off by suction, washed with methanol while excluding air, and subjected to the above described hydrogenation test in 100 cc. of methanol. About 300 cc. of hydrogen are absorbed per hour.

Example 9

The procedure is the same as described in Example 1(b) whereby, cobalt acetate in an equimolecular amount is used, in place of nickel acetate. The resulting cobalt boride catalyst shows in the hydrogenation test a hydrogen absorption which is several times higher than that of a catalyst precipitated from its aqueous solution.

Example 10

The procedure is the same as described in Example 1(b), whereby ferrous nitrate in an equimolecular amount is used, in place of nickel acetate. The resulting ferrous boride catalyst shows in the hydrogenation test a hydrogen absorption which is several times higher than that of a catalyst precipitated from its aqueous solution.

Example 11

16.9 g. of nickel nitrate $Ni(NO_3)_2 \cdot 6H_2O$, corresponding to 3.4 g. of metallic nickel, and 2.6 g. of silver nitrate $AgNO_3$ corresponding to 1.6 g. of silver, are dissolved in ethanol. An ethanolic solution of sodium boron hydride is slowly and gradually added thereto at an initial temperature of $-30°$ C. while stirring vigorously. The temperature increases to $0°$ C. The precipitated mixture of nickel boride and metallic silver is allowed to settle, filtered off by suction, washed with ethanol, and subjected to the above described hydrogenation test while suspended in ethanol. Its catalytic activity is considerably improved.

Example 12

A solution of 3.3 g. of silver nitrate $AgNO_3$, corresponding to 2.1 g. of silver, 1.1 g. of cobalt acetate corresponding to 0.59 g. of cobalt, and 1.6 g. of ferrous nitrate

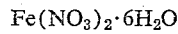

$$Fe(NO_3)_2 \cdot 6H_2O$$

corresponding to 0.3 g. of iron in a mixture of methanol and acetone. A solution of potassium boron hydride in methanol is slowly and gradually added thereto, whereby the temperature is kept below $0°$ C. The precipitated mixture of metallic silver, cobalt boride, and iron boride is filtered off by suction and worked up as described hereinbefore in the preceding examples. The catalytic activity of said mixture is considerably higher than that of the same mixture prepared in aqueous solution.

As stated above, a catalyst consisting solely of copper has no substantial catalytic activity. However, copper addition to the nickel boride, iron boride, and cobalt boride improves the catalytic effectiveness of such catalyst considerably.

It has also been found that small amounts of manganese, chromium, vanadium and tungsten, not substantially exceeding 1.2% of the catalyst may also be used for improving the catalytic effectiveness. However, due to the solubility of such metals in the electrolyte, their improving effect upon the catalytic activity of the various metals and metal borides slowly and gradually disappears.

As shown in Examples 6 and 7, the catalyst may be precipitated on a porous carrier body. In addition to the carrier bodies disclosed in said Examples 6 and 7, there may be employed other neutral carrier bodies such as graphitized carbon, activated carbon, and metallized ceramic sintered bodies. Porous silver and titanium carriers have proved to be especially suitable in electrolytes of a pH-value between 3.0 and 14.0. Porous sintered iron carrier bodies are excellent carrier materials for fuel cell electrodes.

Mixtures of carrier materials have also proved to be of value. Especially suitable are mixtures of porous nickel and titanium or of silver and carbon. Noble metals, such as platinum, palladium, osmium, and gold may be employed as carrier materials. Due to their high price, however, it is advisable to precipitate such noble metals first on a suitable pulverulent carrier.

Of course, many changes and variations in the composition of the catalysts according to the present invention, in their use as electrodes in fuel cells and other electrochemical apparatus, in the solvent used, the concentration of the metal salt and of the alkali metal boron hydride solution employed, in the manner of working up the precipitated catalyst powder and of precipitating the same on carrier bodies, in the selection of the carrier bodies, and the like may be made by those skilled in the art in accordance with the principles set forth herein and in the claims annexed hereto.

I claim:
1. In a process of producing a highly active nickel catalyst, the steps which comprise dissolving nickel acetate and one of the following copper nitrate, chloro platinic acid and hexachloro auric acid or iron bromide in methanol, adding to said solution a methanolic sodium boron hydride solution at a temperature of about $0°$ C., removing the resulting precipitate of nickel boride and one of the following: copper, platinum, gold, and iron boride, washing said precipitate with methanol, and storing the resulting free highly active nickel-metal catalyst in methanol-moist condition until use.

2. In a process of producing a highly catalytically active porous nickel electrode body, the steps which comprise impregnating a porous, sintered nickel body of about 60% porosity with a methanolic solution of one of the following metals: hexachloro auric acid or silver nitrate, treating the resulting impregnated, sintered nickel body with a methanolic sodium boron hydride solution to precipitate one of the following metals gold or silver within the pores of said sintered nickel body, washing the resulting activated nickel electrode body with methanol, and utilizing said electrode body to catalytically activate the transfer of electrons in an electrochemical process.

References Cited

UNITED STATES PATENTS

| | | | |
|---|---|---|---|
| 2,461,661 | 2/1949 | Schlesinger et al. | 23—361 |
| 3,032,399 | 5/1962 | Hoke | 23—204 |
| 3,113,832 | 12/1963 | Vkollonitsch et al. | 23—361 |
| 2,994,729 | 8/1961 | Solomon et al. | 136—24 |
| 3,062,909 | 11/1962 | Reutschi | 136—86 |
| 3,077,507 | 2/1963 | Kordesch et al. | 136—86 |
| 3,183,123 | 5/1965 | Hayworth | 136—120 XR |
| 3,196,048 | 7/1965 | Shropshire et al. | 136—86 |
| 3,244,482 | 4/1966 | Culbertson et al. | 23—204 |
| 2,726,170 | 12/1955 | Warf et al. | 117—65 |

FOREIGN PATENTS 127,242    4/1959    U.S.S.R.

OTHER REFERENCES

Adams, R. M. Boron, Metallo-Boron Compounds and Boranes, Interscience Publishers, N.Y. (1964), p. 408 relied on.

Brown, H. C., et al., J. Am. Chem. Soc. 77 6209 (1955).

ALLEN B. CURTIS, *Primary Examiner.*

WINSTON A. DOUGLAS, *Examiner.*

N. P. BULLOCH, *Assistant Examiner.*